United States Patent [19]

Thulman et al.

[11] 4,342,306
[45] Aug. 3, 1982

[54] WOOD STOVE WITH SAFETY FORCED AIR SYSTEM

[76] Inventors: Robert D. Thulman, 10596 E-1 Twin Rivers Rd., Columbia, Md. 21044; Alve J. Erickson, 17 Pleasant St., Milford, N.H. 03055

[21] Appl. No.: 67,202

[22] Filed: Aug. 16, 1979

[51] Int. Cl.³ .......................................... F02B 75/16
[52] U.S. Cl. ................................. 126/61; 126/163 R; 126/136; 126/77
[58] Field of Search ................... 126/77, 15 R, 15 A, 126/146, 163, 193, 121, 67, 68, 70, 135, 131, 136

[56] References Cited

U.S. PATENT DOCUMENTS

| | | | |
|---|---|---|---|
| 1,048,659 | 12/1912 | Claus | 126/61 |
| 1,211,236 | 1/1917 | Robinson | 126/77 |
| 2,358,044 | 9/1944 | Barnes | 126/193 |
| 2,498,382 | 2/1950 | Smith | 126/287.5 |
| 2,561,934 | 7/1951 | Mayo | 126/15 A |
| 2,742,892 | 4/1956 | Herzer | 126/4 |
| 4,074,679 | 2/1978 | Jensen | 126/121 |
| 4,078,541 | 3/1978 | Roycraft | 126/99 |
| 4,111,181 | 9/1978 | Canney | 126/77 |
| 4,117,824 | 10/1978 | McIntire | 126/15 |
| 4,121,560 | 10/1978 | Knight | 126/63 |
| 4,136,662 | 1/1979 | Willson | 126/61 |
| 4,140,101 | 2/1979 | Glover | 126/77 |
| 4,157,704 | 6/1979 | Zimmer | 126/77 |
| 4,228,783 | 10/1980 | Kalenian | 126/77 |

Primary Examiner—Samuel Scott
Assistant Examiner—G. Anderson
Attorney, Agent, or Firm—Schwartz, Jeffery, Schwaab, Mack, Blumenthal & Koch

[57] ABSTRACT

A high efficiency, air-tight wood stove having a firebox with front, side, rear, top and bottom walls, primary air introducing means for admitting combustion air into the firebox, air flow means adjacent the bottom of the firebox for directing a flow of air upwardly across at least one firebox wall, at least one supplemental air inlet for diverting a portion of the air from the air flow means into the firebox, fan means for forcing air through the air flow means and through the supplemental air inlet, the size of the primary air introducing means being chosen to automatically restrict the combustion in the firebox if the fan means stops to maintain the temperature of the stove and surroundings at safe levels.

23 Claims, 4 Drawing Figures

WOOD STOVE WITH SAFETY FORCED AIR SYSTEM

BACKGROUND OF THE INVENTION

This invention relates to wood stoves. More particularly, this invention relates to an air-tight wood stove with a forced air heat transfer system and means for automatically preventing overheating of the stove if the forced air system is not operative.

Petroleum products have constituted, either directly or indirectly, the principal home heating fuel for at least the last three decades. In recent years restrictions on the availability of petroleum and substantial price increases therefor have fostered a renewed interest in the use of wood stoves for home heating. Wood is a highly advantageous fuel in most areas where it is available and the supply is infinitely renewable. Moreover, in an efficient air-tight stove, the use of wood as a heating fuel is relatively economical.

In response to this interest, a number of air-tight wood stoves have come on the market. Typically, such stoves are designed with tightly sealed fireboxes so that substantially all combustion air for the fire must enter through designated air inlets. By proper adjustment of the air inlets, a controlled burning of the wood fuel in the firebox can be achieved, so that the fire may be maintained even overnight before additional fuel must be charged to the firebox. Large numbers of such stoves have been sold and installed. Unfortunately, in recent years there has been a high incidence of fires in homes equipped with wood stoves, and the general safety record of wood stoves has been poor. Individual owners of stoves often have been unaware of the possible hazards and many serious fires have resulted from the overheating of adjacent combustible walls, floors or furniture. Fires have also arisen from overheating of the stoves themselves which causes cracking and warping of the metal parts.

Concern over the safety of wood stoves has led to the development of safety standards. For example, local jurisdictions may require that a stove must meet Underwriters Laboratories or equivalent test standards which for a cast iron stove with structural walls 3/16" thick require the maximum sustained stove wall temperature under test firing conditions not to exceed 900° F. Stove wall temperatures up to 1000° F. and flue gas temperatures up to 1400° F. may be permitted for periods of short duration. Such standards are not unduly restrictive, and it is regrettable that manufacturers have not been able to meet these safety requirements.

Energy transfer from a wood stove to the surrounding environment occurs primarily in two ways—by radiation and by convection. Radiant energy is transmitted directly from the stove to all surfaces "seen" by the stove. As these surfaces absorb the radiant energy, the surface temperatures are raised and the adjacent air is warmed by conduction. Convective heat transfer from the stove occurs because the air next to the stove is heated directly and then moves upward, to be replaced by more air which is subsequently heated by the hot stove. The amount of convective heat transfer is strongly dependent on the air velocity adjacent to the stove.

The greatest proportion of energy transferred from a wood stove is in the form of radiant energy and this proportion increases as the stove temperature increases. An exposed vertical hot surface at 400° F. (in a room at 70° F.) transfers about 1200 BTUs of energy per hour per square foot. Radiation accounts for approximately 800 BTU/hr ft$^2$ (67%) while convection yields 400 BTU/hr ft$^2$ (33%). At a surface temperature of 800° F. radiation yields about 4200 BTU/hr ft$^2$ (74%) while convection yields about 1100 BTU/hr ft$^2$ (26%). At 1200° F., the radiant heat transfer is 12800 BTU/hr ft$^2$ (85%) and the convective heat transfer is 2270 BTU/hr ft$^2$ (15%).

The intensity of radiated heat energy from the stove varies indirectly as the square of the distance from the stove. Thus, walls or furnishings which are near a hot stove receive large amounts of radiant energy and the wall surface temperature can be raised sufficiently above ignition temperature so that a fire may be started. To prevent such fires it is often required to position stoves substantial distances from surrounding walls and furnishings. Such measures are often inconvenient and wasteful of space and consequently many stove owners fail to observe safe spacings.

Another disadvantage of radiation heat transfer from a hot stove occurs when radiated energy strikes an outside wall of a structure. The increased wall temperature causes greater heat losses to the outside atmosphere.

Some stoves have been designed with shells surrounding the firebox through which air flows. Because of the double barrier, heat transfer by radiation is greatly reduced. The stove size and weight are increased by the shell, and the stove efficiency is usually reduced unless a large amount of stove surface area relative to firebox size is provided.

The efficiency of wood stoves is an important consideration. The overall efficiency depends on how completely the wood is burned, the amount of excess air used for the combustion and the heat transfer efficiency from the interior of the stove to the room. Firebox design, size and location of air inlets, type of wood, etc., determine the completeness of combustion. A well designed stove usually has almost complete combustion. The quantity of excess air admitted to the stove varies widely depending on the design of the stove and on whether the fuel firing rate is high or low. A large amount of excess air carries a significant fraction of the heat up the chimney, thus wasting energy. The heat transfer efficiency depends very strongly on the stove area available for heat transfer, the residence time of the flue gases in the stove and the temperatures of the fire, the flue gases and the stove walls. Thus, heat transfer efficiency at low firing rates is higher than at high firing rates. As the size of a stove increases, the problem of transferring heat from the stove becomes more difficult. The maximum heat producing capacity of a stove depends on the internal volume of the firebox among other factors. The heat transfer capacity depends on the surface area. Since the volume of a stove increases as the cube of its characteristic dimension and the surface area increases only as the square thereof, it can be seen that the maximum heat producing capacity increases more rapidly than the heat transfer capacity as the size of the stove increases. This leads either to higher stove and flue gas temperatures or to limitations on the combustion rate per unit of firebox volume to values below those of smaller stoves.

If the stove wall temperature can be decreased while maintaining the same rate of heat transfer to the room (by improving the convection heat transfer for example), then the heat transfer efficiency can be raised because more heat will be transferred from the fire and the flue gases to the cooler stove wall. The flue gases will leave the stove at a lower temperature and the stack heat loss will be less.

OBJECTS OF THE INVENTION

Accordingly, it is an object of the present invention to provide an air-tight wood stove which has lower stove wall temperatures and which is safer than prior art stoves.

Another object of the present invention is to provide a wood stove in which the proportion of energy transferred from the stove by radiation is reduced and the proportion transferred by convection is increased.

Another object of the present invention is to provide a wood stove in which the danger of chimney fires may be reduced.

A further object of the present invention is to provide a wood stove with a reduced tendency to raise the surface temperature of surrounding combustible walls and furnishings to the ignition point.

Yet another object of the present invention is to provide a wood stove which may safely be installed in closer proximity to surrounding walls and furnishings.

It is also an object of the present invention to provide a wood stove with a reduced tendency for the stove's surfaces to become overheated.

Another object of the present invention is to provide a wood stove having an increased heating capacity for a given stove size.

A further object of the present invention is to provide a wood stove which is more efficient than prior stoves.

An additional object of the present invention is to provide a wood stove in which the rate of heat production is correlated with the rate of heat transfer from the stove.

It is also an object of the present invention to provide a wood stove which may be operated safely and satisfactorily in case of an electrical power failure.

SUMMARY OF THE INVENTION

These and other objects are achieved by providing a high-efficiency safety stove comprising:
- a firebox having front, side, back, top and bottom walls;
- means for introducing fuel into said firebox;
- means for introducing primary combustion air into the firebox through natural draft from the chimney;
- means for exhausting combustion gases from said firebox;
- air flow means adjacent the bottom of said firebox for directing a flow of air upwardly across at least one wall of the firebox;
- supplemental air inlet means for diverting a portion of the air from said air flow means into said firebox, and
- fan means for forcing air through said air flow means and through said supplemental air inlet means;
- said firebox being constructed such that substantially all of the combustion air must enter the firebox through said primary air introducing means or through said supplemental air inlet means;
- the maximum size of said primary air introducing means being sufficiently small that if the fan means stops, the air supply to the fire in the firebox will be automatically reduced to cut back the rate of combustion and maintain the temperature of the stove and surrounding objects at safe levels.

Combustion air may be introduced at a number of different locations in the stove. It may be forced into the firebox underneath the burning fuel. It also may be supplied just above the fuel or it may be introduced as secondary air into the hot flue gases as they enter the area above the fire. It may be advantageous to introduce fan forced air in more than one location in order to optimize combustion.

BRIEF DESCRIPTION OF THE DRAWINGS

The invention will be further explained with reference to the accompanying drawings wherein.

DETAILED DESCRIPTION OF PREFERRED EMBODIMENTS

Figure 1:
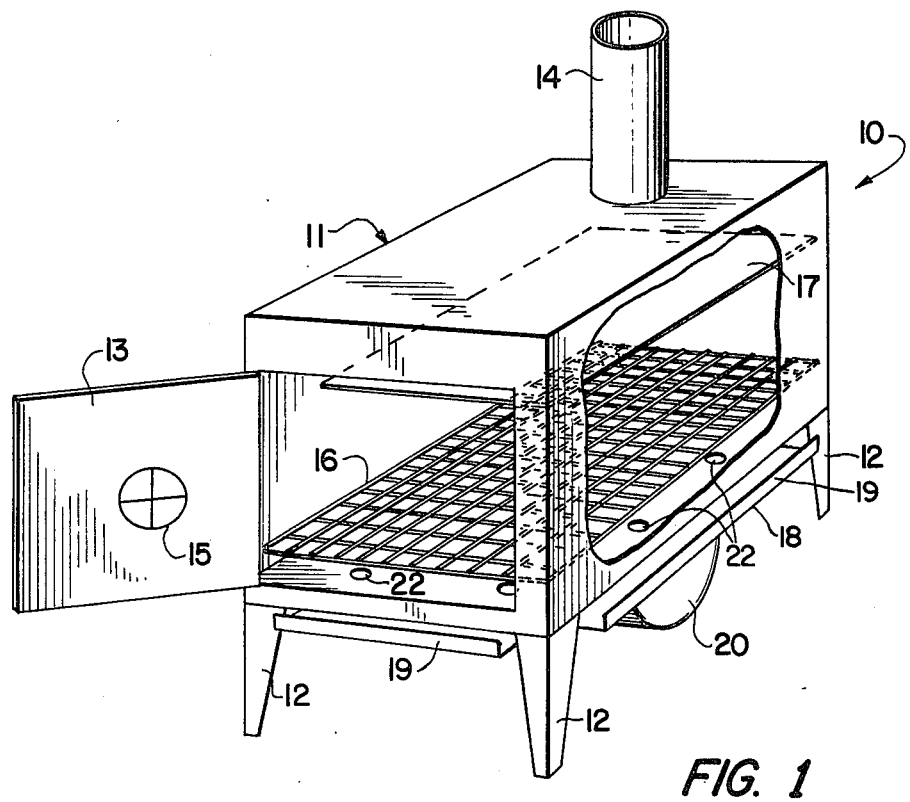
FIG. 1 is a perspective view of a first stove embodiment according to the present invention.
Figure 2:
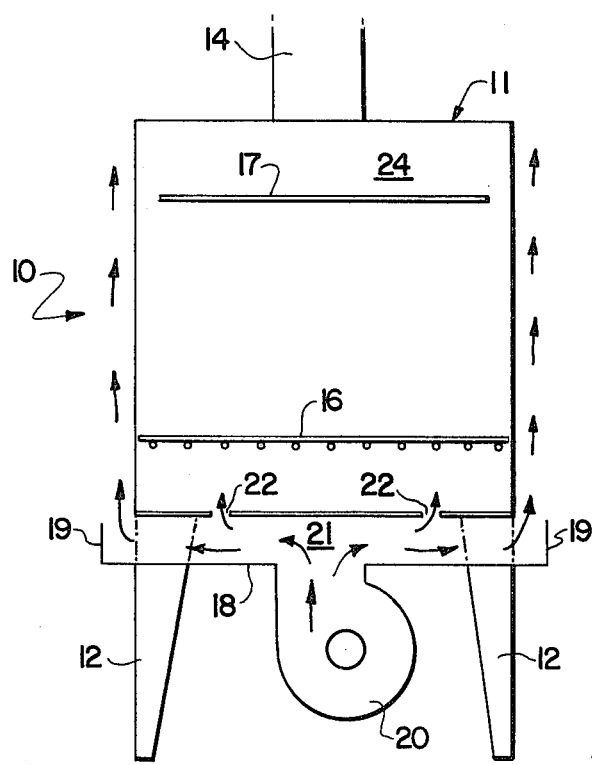
FIG. 2 is a transverse sectional view of the stove of FIG. 1.

FIG. 1 illustrates a wood stove generally indicated by reference numeral 10 comprising a firebox 11 mounted on a plurality of supporting legs 12 to maintain it in spaced relation to the floor or other surface upon which it stands. The stove may be constructed of any suitable material. Cast iron or steel are most commonly utilized. Firebox 11 is provided with a hinged door 13 through which pieces of wood used as fuel may be introduced into the firebox. Stove 10 is also provided with a flue pipe 14 through which combustion gases are exhausted from the firebox. Door 13 is provided with a conventional spin valve 15 which serves as a primary air inlet for combustion air. A slide valve may also be utilized. Firebox 11 is constructed such that when door 13 is closed, substantially all of the combustion air for a fire in the firebox must enter either through spin valve 15 or through the forced air inlets described hereafter. Tests indicate that even at low firing conditions, the stove must be operated with a stoichiometric excess of air. Desirably an excess of 25 to 40% will be utilized. In the illustrated embodiment a grate 16 is disposed in the interior of the firebox to support sticks of wood or coal used as fuel. The interior of firebox 11 also contains a baffle member 17 which fits closely against the side and rear walls of firebox 11 and serves to compel combustion gases from fuel burning on grate 16 to pass to the front of the stove underneath the baffle and then back between the baffle and the top of the stove before exiting through flue pipe 14. By preventing combustion gases from passing directly to flue pipe 14, baffle 17 reduces the heat loss through the flue and increases the overall efficiency of the stove. The side or rear walls of firebox 11 are directly exposed to the surrounding environment, i.e., the firebox is not enclosed in a surrounding shell. Such design minimizes the barriers to heat transfer from the stove to the surrounding environment.

Stove 10 is also provided with an air flow baffle 18 mounted underneath the firebox adjacent the bottom thereof so as to define an air space under the firebox. The marginal edges of the baffle project outwardly beyond the exposed side and rear surfaces of firebox 11 and terminate in upwardly extending air flow guides 19. An electric fan 20 is attached to air baffle 18 in communication with the air space formed by the baffle and the bottom of the firebox. When fan 20 is actuated, a stream of air is forced through air space 21. The flow of air impinges against air flow guides 19 and is directed upwardly along the exposed sides of firebox 11. The air passing along the hot exposed sides of the firebox is heated by contact with the hot surface and carries the heat away by forced convection. The temperature of the exposed surfaces is cooled thereby, and the radiation heat transfer is correspondingly reduced. Thus, according to the invention, the proportion of energy transferred from the stove by convection is markedly increased and radiation heat transfer is reduced.

As a consequence of the reduced temperature of the exposed firebox walls and the decreased radiation heat transfer, the stove of the invention is less likely to raise the surface temperature of surrounding walls or furnishings to ignition levels and may be safely installed in closer proximity to the surrounding walls and/or furnishings than prior art stoves.

The stove of the invention is provided with at least one orifice 22 extending through the bottom of the firebox communicating between air space 21 and the interior of the firebox. A number of such orifices may be distributed across the bottom of the firebox or in locations deemed desirable. Orifices 22 constitute supplemental air inlets through which additional combustion air is forced by fan 20. This action achieves a "forge" effect in the forebox and serves to substantially increase the firing capacity of the above. If desired, the size or number of the orifices 22 may be adjustable so that the amount of air admitted therethrough into the firebox may be varied. Also, orifices 22 may be provided with adjustable nozzles for varying the direction or location of the air admitted therethrough into the firebox. The air flow may be directed from some inlets to cool glass inserts in the firebox wall under high firing conditions.

Fan 20 may advantageously be a multi-speed or variable speed fan. An increase in the fan speed will force more air through orifices 22 and increase the rate of combustion within the firebox. Simultaneously, more air will also be forced across the exposed wall of the firebox to increase the transfer of energy from the firebox to the surroundings. A correlation of the rate of combustion and the rate of heat transfer is thus achieved.

If fan 20 should stop, either as a result of an electrical power interruption, or as a result of a mechanical malfunction, or by operator choice, then the flow of air across the exposed walls of the firebox and the resulting convective heat transfer therefrom will, of course, be significantly reduced. If the rate of combustion in the firebox were to remain unchecked, the temperature of the firebox walls and the radiation heat transfer to surrounding walls and furnishings might reach dangerous levels. However, an important aspect of the present invention is that the maximum opening of spin valve 15 is sized such that the amount of air which will pass therethrough is insufficient to maintain high and dangerous firing rates. Each supplemental air orifice 22 is small, and the amount of air passing therethrough when fan 20 is stopped is negligible. Since combustion air cannot enter the firebox except through spin valve 15 or supplemental air orifices 22, the rate of combustion within the firebox will automatically be cut back to a safe level due to the reduced air supply.

Figure 3:
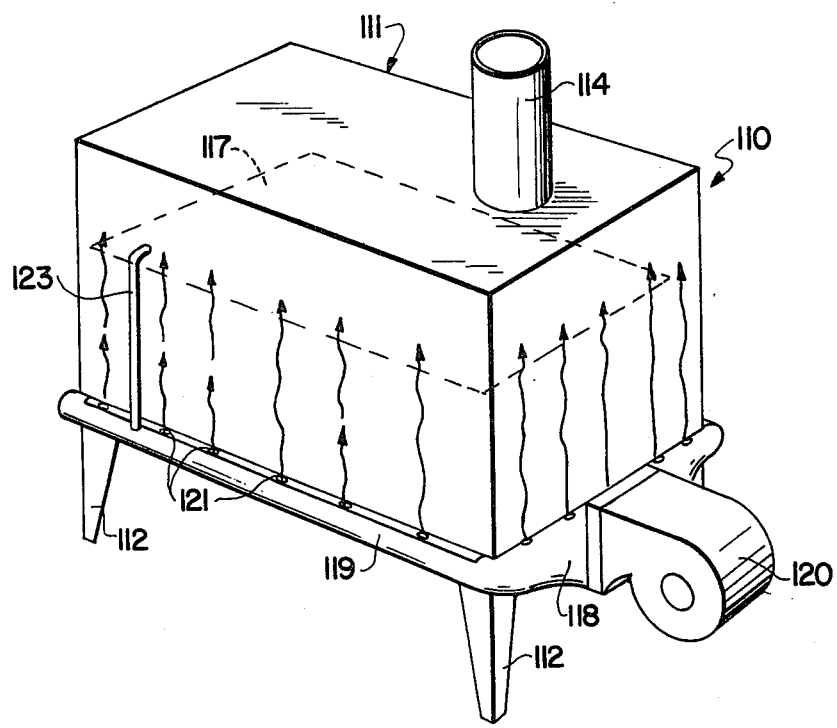
FIG. 3 is a perspective view of a second wood stove embodiment according to the present invention.
Figure 4:
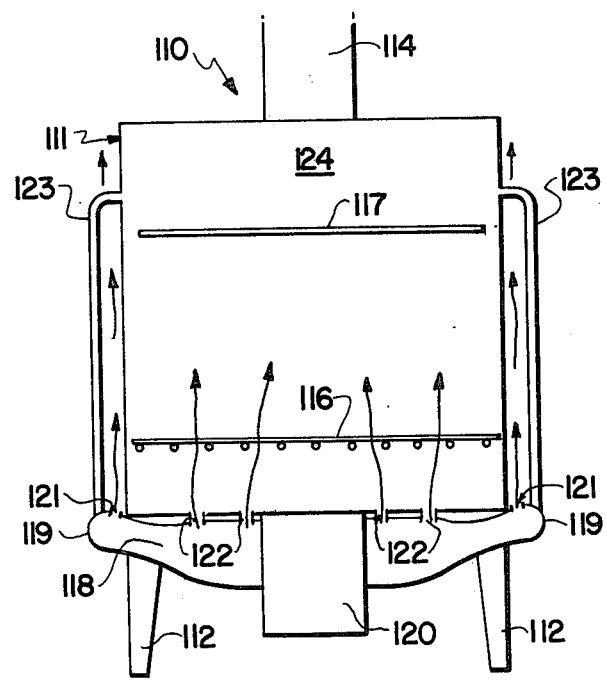
FIG. 4 is a transverse sectional view of the stove of FIG. 3.

FIGS. 3 and 4 illustrate a second embodiment of a wood stove according to the present invention. The stove is generally designated by reference numeral 110 and comprises a firebox 111 mounted on supporting legs 112. Stove 110 is provided with an interior grate 116, an interior baffle 117 and a flue pipe 114 corresponding in structure and operation to the similar parts in stove 10. A plenum 118 is mounted underneath firebox 111. One end of the plenum is connected to a fan 120 and the other end to a pair of air ducts 119 which extend along the lower margins of the exposed sidewalls of the firebox. A plurality of apertures 121 are formed through the top of air duct 119 so that air will be forced by fan 120 through plenum 118, air duct 119 and orifices 121 and caused to flow across the exposed walls of firebox 111 to enhance convective heat transfer and reduce the temperature of the firebox walls. A plurality of small orifices 122 are also formed through the top of plenum 118 and the bottom of firebox 111 so that supplemental combustion air is forced into the interior of the firebox by fan 120. Stove 110 may also be provided with a pair of secondary air tubes 123. One end of each tube 123 is connected to an air duct 119 and the other end opens into the space 124 established between the top of baffle 117 and the top of firebox 111. Fan 120 forces additional secondary combustion air through secondary air tubes 123 to promote complete burning of all combustible materials in the combustion gases before they pass from the firebox to flue pipe 115. This produces an additional increase in the efficiency of the stove and also acts as an additional safeguard against the formation of dangerous creosote deposits in the flue.

Firebox 111 is substantially "air-tight" so that if fan 120 is stopped for any reason, the flow of supplemental air drops to a negligible value and the rate of combustion within the firebox is automatically cut back to the level which can be supported by the air admitted through the primary air inlet. By appropriate sizing of the primary air inlet, combustion may thus be maintained at safe levels in the event of fan failure.

The structural features of the invention interact to enhance both heat transfer efficiency and combustion efficiency, promote uniform low wall temperatures while reducing the need for internal baffles and external shrouds which impede heat transfer, increase the heat producing capacity in comparison to conventional stoves of comparable size while maintaining safe temperatures and preventing excessive radiation heat transfer, and provide a safe, effective source of heat both with and without the fan system in operation. Stoves constructed according to the present invention will meet Underwriters Laboratories standards both with and without the fan in operation.

The forced air system for heat transfer and combustion described herein has been tested on a typical airtight woodburning stove. Table I illustrates the magnitude of reduction in stove wall temperature when the forced air system is operating. The fuel firing rate is the same in both cases. Temperatures are in degrees F.

TABLE I

| Fan | Off | On | On |
|---|---|---|---|
| Supplemental Air Inlet | Closed | Closed | Open |
| Flue Gas Temperature | 1037 | 968 | 899 |
| Average Stove Wall Temp | | | |
| Side | 946 | 601 | 627 |
| Back | 874 | 568 | 653 |

It can be seen that significant reductions in flue gas and stove wall temperatures are achieved.

The reduction in flue gas temperature with the fan on and the supplemental air inlet closed is an indication of increased heat transfer efficiency.

The foregoing embodiments have been described only as examples of the invention and are not intended to be limiting. Since modifications of the disclosed embodiments may occur to persons skilled in the art, the scope of the invention is to be limited solely by the scope of the appended claims.

What is claimed is:

1. A high-efficiency safety stove for burning solid fuels comprising:
   (a) a firebox having at least one exterior single-wall exposed to the space to be heated;
   (b) means for introducing a solid fuel into said firebox;
   (c) means for exhausting combustion gases from said firebox;
   (d) primary air introducing means for admitting combustion air into said firebox;
   (e) forced air flow means for directing a flow of room air across at least said one exposed single-wall of said firebox;
   (f) supplemental air inlet means for diverting a portion of the air from said air flow means into said firebox;
   (g) fan means for forcing room air through said air flow means and through said supplemental air inlet means;
   (h) said firebox being constructed such that substantially all of the combustion air must enter the firebox through said primary air introducing means or through said supplemental air inlet means;
   (i) the maximum sizing of said primary air introducing means being sufficiently small that if the fan means stops, the rate of combustion in the firebox will be automatically reduced to maintain the temperature of the stove at a safe level; and
   (j) means for controlling the amount of air introduced into said firebox through said primary air introducing means.

2. A stove according to claim 1, wherein said air flow means comprises an external baffle disposed adjacent the firebox in spaced relation thereto and defining an air space therebetween, said baffle projecting beyond an exposed exterior wall of said firebox and terminating in an air flow guide for directing a flow of air across aid exposed exterior wall of the firebox.

3. A stove according to claim 1, wherein said fuel introducing means comprises a hinged door.

4. A stove according to claim 1, wherein said fan means comprises a multi-speed electric fan.

5. A stove according to claim 1 further comprising internal baffle means for preventing combustion gases from passing directly to said exhausting means.

6. A stove according to claim 1, wherein said primary air inlet means comprises an adjustable spin-valve or slide valve.

7. A stove according to claim 1, wherein the size of the primary air introducing means is such that the stove temperature is prevented from exceeding 930° F. when the fan means is stopped.

8. A stove according to claim 1 further comprising internal grate means for supporting fuel in said firebox.

9. A stove according to claim 1, wherein said firebox is constructed of cast iron.

10. A stove according to claim 1, wherein the stove is a wood-burning stove.

11. A stove according to claim 2, wherein the size of the primary air introducing means is such that when the fan means is stopped, the rate of combustion is reduced sufficiently that the radiation energy transfer from the stove is not greater than the radiation energy transfer when the fan is on.

12. A stove according to claim 1, wherein said air flow means comprises an external baffle disposed beneath the firebox in spaced relation thereto and defining an air space therebetween, said baffle projecting laterally beyond the exposed exterior wall of said firebox and terminating in an upwardly extending air flow guide for directing a flow of air across an exposed exterior wall of the firebox.

13. A stove according to claim 1, wherein said supplemental air inlet means comprises at least one small opening through the bottom of said firebox communicating between said air flow means and the interior of said firebox.

14. A stove according to claim 1, wherein said air flow means comprises an enclosed duct extending along the lower edge of at least one side of said stove.

15. A stove according to claim 14, wherein said supplemental air inlet means comprises a plurality of small openings extending through the sidewalls of the firebox communicating between the interior of said air duct and the interior of said firebox.

16. A stove according to claim 14, wherein said openings open into the firebox beneath a fuel supporting grate.

17. A stove according to claim 14, wherein said supplemental air inlet means comprises a plurality of tubes communicating between said air duct and the interior of said firebox.

18. A stove according to claim 8, wherein said supplemental air inlet means opens into said firebox beneath said grate.

19. A stove according to claim 8, wherein said supplemental air inlet means opens into said firebox above said grate.

20. A stove according to claim 5, wherein said supplemental air inlet means opens into said firebox above said internal baffle means.

21. A stove according to claim 21, wherein the side, rear and front walls of the firebox are exposed.

22. A stove according to claim 1, wherein the size of said supplemental air inlet means is adjustable to vary the amount of air admitted therethrough into the firebox.

23. A stove according to claim 1, wherein said supplemental air inlet means comprises at least one adjustable nozzle for varying the direction or location of the air admitted therethrough into the firebox.

* * * * *